Jan. 22, 1963 H. OSTERHOUDT 3,074,253
INTERLOCK FOR SPEEDOMETER HEAD AND CABLE
Filed Dec. 2, 1960
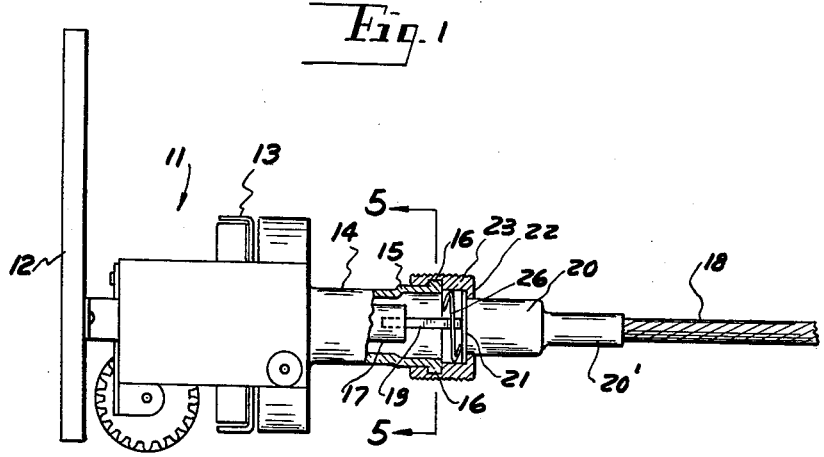
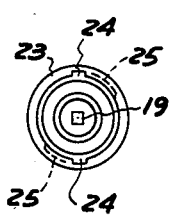
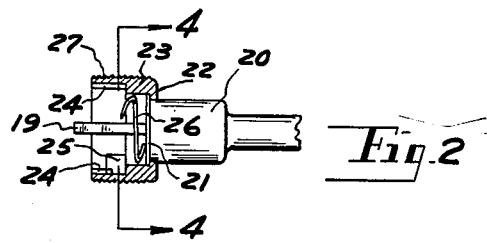
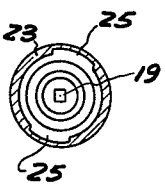
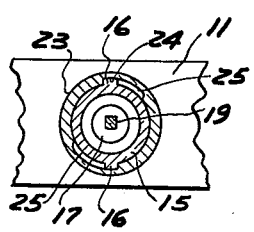
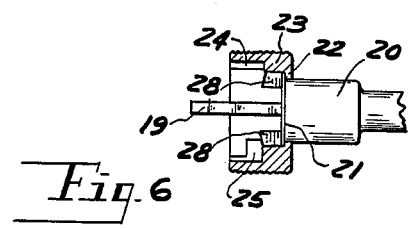
INVENTOR.
HARRY OSTERHOUDT
BY
Robert A. Sloman.
ATTORNEY

United States Patent Office 3,074,253
Patented Jan. 22, 1963

3,074,253
INTERLOCK FOR SPEEDOMETER HEAD AND CABLE
Harry Osterhoudt, Detroit, Mich., assignor to Perfection Automotive Products Corporation, Wayne County, Mich., a corporation of Michigan
Filed Dec. 2, 1960, Ser. No. 73,378
1 Claim. (Cl. 64—4)

This invention relates to speedometer cables and speedometer heads and more particularly to a bayonet connection between said cable and head.

Heretofore, in assemblies of this type, the speedometer head had formed around the boss journalling the driven member, a continuous thread adapted to receive and have threaded thereover the interiorally threaded head or attaching head upon the end of the speedometer cable for securing thereto with the driven flexible shaft within the said cable operatively joined with the driven member within the speedometer head.

It is the object of the present invention to provide a novel form of attachment between the speedometer cable and head, which eliminates the threading operation and which provides a faster method of interconnecting the two parts.

It is a further object of the present invention to provide a bayonet type of interconnection between the speedometer cable mounting and the speedometer head.

These and other objects will be seen from the following specification and claim in conjunction with the appended drawings in which:

FIG. 1 is a side elevational view of a conventional speedometer head partly broken away and in association with a speedometer cable fragmentarily shown and secured thereto in accordance with the present invention.

FIG. 2 is a longitudinal section of the head portion on the end of the speedometer cable assembly.

FIG. 3 is an end view thereof.

FIG. 4 is a section taken on line 4—4 of FIG. 2.

FIG. 5 is a section shown fragmentarily taken on line 5—5 of FIG. 1.

FIG. 6 is similar to FIG. 2 showing a variation.

It will be understood that the above drawing illustrates merely a preferred embodiment of the invention and that other embodiments are contemplated within the scope of the claims hereinafter set forth.

Referring to the drawing, the present speedometer head, generally indicated at 11, includes a body which mounts upon its forward end the speedometer dial 12. As the operation and mechanism of the speedometer head forms no part of the present invention, only a brief description of the basic operative elements are referred to.

For example, the cable driven cup shaped member 13 has a fixed connection with the forwardly extending axial shank 17 which is suitably journalled within the rearwardly extending boss 14 forming a part of the speedometer head. The driven member 17 forming a part of the speedometer head has an axial bore extending to its outer end which is square in cross section, as is customary in assemblies of this type.

In normal operation, there is provisioned within the relative stationary and flexible cable 18, namely the speedometer cable, the driven or rotative flexible metallic shaft 19 also square in cross section, and which as shown in FIG. 1 has its free end operatively projected within a corresponding bore in the driven member 17, when assembled.

The boss 14 has upon its outer end and as an integral part thereof the annular sleeve 15 and there are formed within the outer surface of said sleeve a pair of outwardly extending oppositely arranged radial bosses 16.

In conventional constructions the corresponding sleeve 15 would normally be exteriorly threaded. The bosses 16 replace said threaded member, or the threaded portion thereof.

A conventional speedometer cable is generally indicated at 18 fragmentarily and has loosely positioned axially thereof the flexible conventional driven member 19 in the nature of a flexible shaft, as above described. A formed cylindrical head 20 has a reduced shank 20', which is mounted over the free end of cable 18 and suitably secured thereof, as by crimping in a conventional manner.

The head 20 has an annular flange 21 at its outer end by which the said head is retained within the cupshaped fastening sleeve 23 with the said flange 21 bearing against the centrally apertured bottom wall 22 of the said sleeve 23, completing the assembly. This much of the speedometer cable is conventional in the sense that there is normally provided within the cable 18 the elongated driven shaft 19 of square cross section above described which projects axially through and outwardly of cable head 20 as well as the cupshaped securing member 23.

The present invention is particularly directed to the interior formation of the cupshaped fastener 23 by which an interlock is achieved between the speedometer cable assembly and the speedometer head.

In accordance with the present invention there are formed upon the interior surface of cupshape retainer 23 a pair of longitudinally extending oppositely arranged slots 24 which are undercut therein and which are adapted to cooperatively and slidably receive the opposed pair of bosses 16 on sleeve 15 of the speedometer head.

The inner ends of the longitudinal or axial slots 24 terminate in the right angularly related undercut grooves 25 to thus complete a bayonet type of connection and wherein the bosses 16 are interlocked with respect to the securing member 23. This is a substantially conventional bayonet type of connection and it is believed to be a novel method of interconnecting a speedometer head and a speedometer cable.

Forming a part of the present invention, there is a spring biasing means interposed between member 23 and the sleeve 15 of the speedometer head. In the preferred embodiment of the invention there is provided a formed resilient or spring-like member 26 normally nested within cupshaped body 23 so that parts are assembled under compression and the spring forces are utilized for normally maintaining the head 23 frictionally locked with respect to the bayonet bosses 16 completing the assembly. The spring means may be of various types or could be merely resilient or yielding cam surfaces within the head 23 cooperatively and retainingly engaging end portions of the sleeve 15 for completing the assembly, best illustrated in FIG. 1.

To facilitate the assembly of the cable head fastener 23 with respect to the male fitting 15 on the speedometer head, the exterior surface of the member 23 is knurled as at 27.

A slightly different form of biasing means is shown in FIG. 6 instead of the spring means 26 shown in FIGS. 1 and 2 for frictionally retaining the assembled parts in locked relationship.

The structure shown in FIG. 6 is the same as that shown in FIG. 2 except that instead of the resilient means 26 there are employed a pair of cam elements 28 upon the interior of the fastener 23 adapted for operative frictional locking engagement with a portion of the fitting 15 when the parts have been adjusted into locking relationship.

Having described my invention, reference should now be had to the following claim.

I claim:

A speedometer head including an open end tubular fitting having a flat end face arranged perpendicular to the axis thereof, and having integral radial lugs projecting outwardly laterally from and at the very open end of said fitting, the lugs each having a flat end face coplanar with said fitting flat end face; a speedometer cable having a tubular fastener formed with a first bore of a diameter to receive the open end of said fitting and a second bore of a smaller diameter and the bores being coaxial to form a flat, radially arranged annular shoulder where they meet; bayonet locking means formed in the wall surface of said first bore and comprising axial entrant grooves, each with a right angular undercut extension at its inner end for slidably and retainingly receiving said lugs, the extensions each having a flat, inner, radially arranged surface coplanar with said shoulder, the lugs being fitted within said extensions with the end faces of the lugs and of the fitting being in tight face to face contact with the radial surface and shoulder respectively, thus locking the fitting within the first bore and normally holding the fitting and fastener against relative motion.

References Cited in the file of this patent

UNITED STATES PATENTS

| | | |
|---|---|---|
| 1,138,926 | Bernett | May 11, 1915 |
| 1,320,582 | Sperling | Nov. 4, 1919 |
| 1,691,200 | Krug | Nov. 13, 1928 |
| 1,841,008 | Burn | Jan. 12, 1932 |
| 2,051,965 | Roth | Aug. 25, 1936 |
| 2,278,095 | Rogers | Mar. 31, 1942 |
| 2,880,435 | Deutsch et al. | Apr. 7, 1959 |
| 2,985,457 | Sima | May 23, 1961 |

FOREIGN PATENTS

| | | |
|---|---|---|
| 1,087,713 | France | Aug. 25, 1954 |